(12) United States Patent
Yu et al.

(10) Patent No.: US 10,500,555 B2
(45) Date of Patent: Dec. 10, 2019

(54) PROCESS

(71) Applicants: Addivant Switzerland GmbH, Reinach (CH); Yantai Loncai Advanced Materials Co., Ltd., Yantai (CN)

(72) Inventors: Jiong Yu, Reinach (CH); Peter Smith, Reinach (CH); Shengli Gao, Reinach (CH)

(73) Assignee: Addivant Switzerland GmbH, Reinach (CH)

( * ) Notice: Subject to any disclaimer, the term of this patent is extended or adjusted under 35 U.S.C. 154(b) by 236 days.

(21) Appl. No.: 15/120,523

(22) PCT Filed: Feb. 20, 2015

(86) PCT No.: PCT/EP2015/053665
§ 371 (c)(1),
(2) Date: Aug. 21, 2016

(87) PCT Pub. No.: WO2015/124751
PCT Pub. Date: Aug. 27, 2015

(65) Prior Publication Data
US 2017/0014790 A1    Jan. 19, 2017

(30) Foreign Application Priority Data

Feb. 21, 2014 (GB) .................................. 1403057.1

(51) Int. Cl.
*B01J 2/20* (2006.01)
*C08K 3/26* (2006.01)
(Continued)

(52) U.S. Cl.
CPC ..................................... *B01J 2/20* (2013.01);
*C08K 3/26* (2013.01); *C08K 5/005* (2013.01);
*C08K 5/098* (2013.01);
(Continued)

(58) Field of Classification Search
CPC ... B01J 2/20; C08K 3/26; C08K 5/005; C08K 5/098; C08K 5/1345; C08K 5/526
See application file for complete search history.

(56) References Cited

U.S. PATENT DOCUMENTS 5,240,642 A   8/1993  Neri et al.
6,033,600 A   3/2000  Henkins et al.

FOREIGN PATENT DOCUMENTS

EP      0301599 A    2/1989
WO   WO2005/071008 A   8/2005
WO   WO2007149143 A2  12/2007

OTHER PUBLICATIONS

World Intellectual Property Organization, International Preliminary Examination Report for PCT/EP2015/053665, dated Aug. 23, 2016.
(Continued)

*Primary Examiner* — John E Uselding
(74) *Attorney, Agent, or Firm* — D'Hue Law LLC; Cedric A. D'Hue

(57) ABSTRACT

The present disclosure relates to a process for forming substantially dust-free additive granules, comprising the steps of:
 a) extruding or otherwise processing an additive or blend of additives to provide an substrate;
 b) cooling the substrate;
 c) conveying the substrate onto a profiled surface; and
 d) fragmenting the substrate into granules by means of a first rotating roller bearing on the substrate on the profiled surface.

29 Claims, 6 Drawing Sheets

(51) Int. Cl.
    *C08K 5/00*      (2006.01)
    *C08K 5/098*     (2006.01)
    *C08K 5/134*     (2006.01)
    *C08K 5/526*     (2006.01)

(52) U.S. Cl.
    CPC ............ *C08K 5/1345* (2013.01); *C08K 5/526* (2013.01); *C08K 2003/267* (2013.01)

(56) References Cited

OTHER PUBLICATIONS

Patent Cooperation Treaty International Search Report for International Application No. PCT/EP2015/053655, dated Feb. 20, 2015.
Written Opinion of the international Search Authority for International Application No. PCT/EP2015/053665, dated Feb. 20, 2015.
International Application No. PCT/EP2015/053665, filed Feb. 20, 2015.

PROCESS

CROSS REFERENCE TO RELATED APPLICATIONS

This application is a U.S. national phase filing of PCT international patent application No. PCT/EP2015/053665, with a filing date of Feb. 20, 2015, which in turn claims the benefit of British patent application serial number 1403057.1, filed Feb. 21, 2014, the disclosures of which are expressly incorporated by reference.

FIELD

The present disclosure relates to a process for forming substantially dust-free granules of additives and blends of additives. Such granules of additives and blends of additives may be added to polymer compositions, in particular organic polymer compositions.

It is known to use additives (both singly and in blends containing more than one additive) in polymer compositions, for example to stabilize them. These additives usually exist in powder form. However, there are several drawbacks associated with the use of additives in powder form, including the formation of dust. To reduce the problems associated with additives in powder form, granules of the additive may be formed, for example using compacting techniques or by adding liquid and/or a binder to the additive. Such a binder may include waxes, paraffins and stearic acid amides.

It is often preferable to form additive granules using compacting techniques rather than adding liquid and/or a binder to the additive, since the presence of liquid and/or a binder may be undesirable in the final polymer composition and affect its final properties. In addition, the presence of liquid and/or a binder in the additive granules may cause problems during incorporation with the polymer and in the final application, e.g. reduced additive dispersion and/or extrudation. However, a major drawback of additive granules formed using simple compacting techniques is the unsuitable level of dust still present. Dust particles can cause serious environmental health and safety issues. These include, for example, the risk of personnel inhaling dust particles which may be hazardous to health and the risk of explosion due to fine dust particles in the atmosphere.

U.S. Pat. No. 6,033,600 describes a composition containing a pentaerythritol phosphite, a hindered phenolic isocyanurate, a metal salt of a fatty acid and hydrotalcite. The document also describes a process for forming compacted particles, which involves blending the above-mentioned ingredients and compacting them under pressure to form compacted particles, such as pellets. More specifically, a pair of compaction rollers is used to compress the blended ingredient into a pre-compacted material. The pre-compacted material is then transported to a pelletiser in order to cut the compacted material into pellets.

U.S. Pat. No. 5,240,642 describes a process for forming granules of organic and inorganic antacid additives and tetrakis-[3-(3,5-di-tert-butyl-4-hydroxyphenyl)-propionyloxymethyl]-methane, carried out in the presence of an amount of the latter compound in the molten state, homogeneously distributed throughout the powder mass.

EP1706451 describes a method of producing low-dust granules of polymer additives or polymer additive mixtures, wherein the granule-forming polymer additives are mixed together, the mixture is converted into a workable mass and pressed through an orifice, the pre-shaped strand-like extruded mass is cooled and, while still in a workable state, formed into granules by rolling, impressing, cooling and comminuting. More specifically, shaping rollers are used to impress the granule size into the extrudate. The impressed extrudate is then cooled on a belt and broken up into coarse pieces which are subsequently broken into individual granules in a sieve granulator.

There are numerous disadvantages associated with these and other prior art processes for forming additives or blends of additives in granular form, including the formation of unsuitable levels of dust and the large number of process steps required to form the granules.

Consequently, there is a clear need in industry for an improved process for forming substantially dust-free additive granules which requires a reduced number of process steps.

SUMMARY

According to a first aspect of the present disclosure, there is provided a process for forming substantially dust-free additive granules, comprising the steps of:
a) extruding or otherwise processing an additive or blend of additives to provide a substrate;
b) cooling the substrate;
c) conveying the substrate onto a profiled surface; and
d) fragmenting the substrate into granules by means of a first rotating roller bearing on the substrate on the profiled surface.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein.

Figure 1:
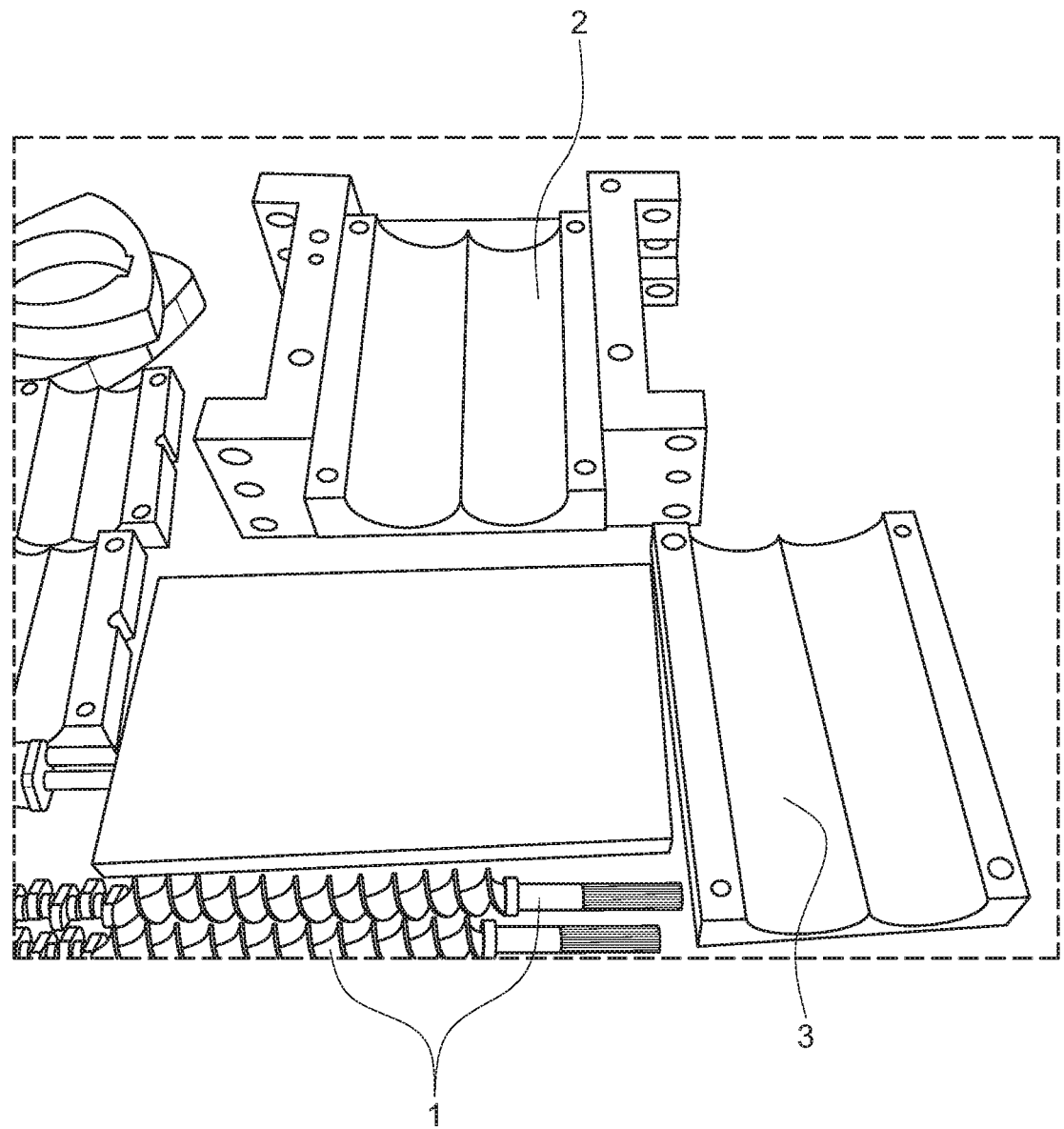
FIG. 1 is a photograph of the component parts of a twin-screw extruder.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

DETAILED DESCRIPTION

The embodiments disclosed below are not intended to be exhaustive or limit the disclosure to the precise forms disclosed in the following detailed description. Rather, the embodiments are chosen and described so that others skilled in the art may utilize their teachings.

For the avoidance of doubt, in this context the term 'granule' covers beads, tablets, pellets, pastilles, fragments, flakes, particles and the like.

In this context the term 'dust' covers particles with a diameter of less than about 0.5 mm.

By 'substantially dust-free' is meant that there is little or no dust present in the resulting additive granules. For example, there may be less than 15%, less than 10%, less than 5%, less than 2%, less than 1%, less than 0.75%, less than 0.5%, less than 0.25%, less than 0.1%, less than 0.075%, less than 0.05%, less than 0.025%, less than 0.01% or 0% by weight of dust present in the resulting additive granules. The reduced level of dust in the additive granules is advantageous in terms of environmental health and safety. In particular, the reduced level of dust reduces the likelihood that personnel will inhale the harmful dust particles.

The substrate may for example be an extrudate or it may be a workable substrate mass formed for example by melting and/or kneading of the additive or blend of additives. For convenience we shall use the term 'extrudate' as a shorthand term, but it will be understood that other modes of processing other than extrusion can be used to form the substrate, which may be suitably shaped (e.g. flattened) for further processing and fragmentation by the first rotating roller bearing on the substrate on the profiled surface.

In step a) the extrusion or otherwise processing of the additive or blend of additives may be carried out using an extruder, kneader and/or other melting and mixing device. The extruder may be a screw extruder, for example a single-screw or twin-screw extruder. Preferably, the extrusion step is carried out using a twin-screw extruder, for example a LPE® SLJ series extruder.

The screw extruder may comprise a housing which surrounds the screw(s). Preferably, the housing, for example a metal barrel, is formed from two halves which can be separated to reveal the screw(s). The separable housing provides numerous benefits, including improved ease of cleaning, maintenance and replacement of the screw(s).

The screw extruder may comprise any number of heating zones, for example from 1 to 10 heating zones. Preferably, the screw extruder comprises 5 to 8 heating zones.

The temperature of the, any or all of the heating zones may be from about 20° C. to about 250° C. Preferably, the temperature of the, any or all of the heating zones is from about 20° C. to about 240° C., more preferably from about 70° C. to about 130° C.

The extruder screw(s) may have an outer diameter (Do) of between about 10 mm and about 150 mm. Preferably, the extruder screw(s) have an outer diameter of between about 50 mm and about 120 mm and more preferably, of between about 60 mm and about 100 mm.

The extruder screw(s) may have an inner diameter (Di) of between about 10 mm and about 100 mm. Preferably, the extruder screw(s) have an inner diameter of between about 20 mm and about 70 mm and more preferably, of between about 30 mm and about 60 mm.

The length to outer diameter ratio (L:Do) of the extruder screw(s) may be from about 10:1 to about 40:1. Preferably, the L:Do ration of the extruder screw(s) is from about 18:1 to about 30:1.

The rotation speed of the extruder screw(s) may be any suitable speed for forming the extrudate. For example, the rotation speed of the extruder screw(s) may be from about 10 RPM to about 1000 RPM. More specifically, the rotation speed of the screw(s) may be from about 10 RPM, about 15 RPM, about 20 RPM, about 30 RPM, about 40 RPM or about 50 RPM to about 60 RPM, about 70 RPM, about 80 RPM, about 90 RPM, about 100 RPM, about 110 RPM or about 120 RPM.

Preferably, the extruder comprises an open-die through which the additive or blend of additives is extruded. An open-die has a cross-section which is open i.e. the cross-section does not entirely surround the extrudate.

The feed rate of the extruder i.e. the mass of additive/additive blend fed into the extruder per unit of time is dependent on the type, and more specifically the size, of extruder used. For example, where an LPE® SLJ series extruder is used, the feed rate may be from about 100 kg/h to about 500 kg/hr, from about 200 kg/h to about 400 kg/hr, or from about 300 kg/hr to about 350 kg/hr.

The inventors of the present disclosure have surprisingly found that the feed rate of the extruder can be significantly increased using an extruder with an open-die as described above.

Where granules comprising a blend of additives are required, there may be an additional step prior to step a) which involves mixing the additives together to form a substantially homogeneous blend. The mixing step may be carried out using a high speed mixer.

Step b) involves cooling the substrate from step a). The substrate from step a) may be passed to one or more cooling drums and/or a cooling belt. Preferably, both one or more cooling drums and a cooling belt are used.

Each cooling drum, which may form a calender or a part of a calender, may simultaneously chill and shape the substrate into a sheet. Any number of cooling drums may be used, for example from 1 to 10 cooling drums. Where only one cooling drum is used, there may also be included an underlying surface adjacent the cooling drum.

Preferably, 2 cooling drums are used. Each cooling drum may have a substantially smooth surface.

The cooling drum(s) may be maintained at a reduced temperature using water or another heat transfer material. The temperature of the cooling drum(s) may be effective to cool the substrate to a temperature at which it can be fragmented and/or to a temperature suitable for further cooling using a cooling belt. Thus, the temperature of the cooling drum(s) is dependent on the composition of the substrate. The temperature of the cooling drum(s) may, for example, be from about 10° C. to about 30° C. Preferably, the temperature of the cooling drum(s) is from about 15° C. to about 20° C. The underlying surface adjacent the cooling drum, where present, may also be maintained at a reduced temperature as described above.

The size of the cooling drum(s) may be effective to cool and shape the substrate into a sheet which can be fragmented. The size of the cooling drum(s) may, for example, have a diameter from about 200 mm to about 500 mm. Where more than one cooling drum is used, each of the cooling drums may be of the same or of a different size. The distance between the cooling drum and the underlying surface or between the multiple cooling drums varies depending on the desired thickness of the cooled substrate. For example, the distance may be from about 0.5 mm to about 3 mm to give a cooled substrate with a thickness of from about 0.5 mm to about 3 mm. Preferably, the distance is from about 1 mm to about 2 mm which gives a cooled substrate with a thickness of from about 1 mm to about 2 mm.

The cooling drum(s) may rotate at a speed which is effective to cool and shape the substrate into a sheet which can be fragmented. The shape of the cooling drum(s) and the associated cooling surface area of the drum(s) may influence the speed which is effective to cool and shape the substrate. Additionally or alternatively, the composition of the substrate may influence the rotation speed of the cooling drum(s) which is effective to cool and shape the substrate into a sheet. The cooling drum(s) may rotate at a speed of between about 0.1 RPM and about 5 RPM, for example. Preferably, the cooling drum(s) rotate at a speed of between about 1 RPM and 2 RPM.

The cooling belt may be any cooling belt known in the art, for example a Sandvik® steel belt cooler. Preferably, the cooling belt utilizes a reverse side cooling system. For example, the reverse side of the cooling belt may be cooled using water. The cooling belt may be maintained at any suitable temperature for cooling and/or maintaining the substrate at a temperature at which it can be fragmented. Preferably, the cooling belt has a substantially smooth surface.

The cooling belt may be any suitable length, for example between about 5 m and about 20 m long or from about 5 m to about 10 m long. The cooling belt may operate at a speed of from about 0.1 m/s to about 5 m/s. Preferably, the cooling belt operates at a speed of from about 0.1 m/s to about 3 m/s.

The substrate from step a) may be cooled before or during conveyance onto the profiled surface.

Step c) involves conveying the substrate onto a profiled surface.

Prior to step d), for example before or during the step of conveying the substrate onto the profiled surface, the substrate may be subjected to preliminary fragmentation. The preliminary fragmentation may result in the substrate being broken down into smaller substrate pieces, which may be irregular in shape and size. For example, the substrate may be broken down into pieces having a width of between about 100 mm and about 150 mm and/or a length of between about 100 mm and about 150 mm.

The preliminary fragmentation may be carried out using any equipment suitable for breaking the substrate into smaller substrate pieces. However, the inventors of the present disclosure have found that particularly suitable equipment for the preliminary fragmentation of the substrate comprises a rotating shaft with arms extending therefrom. The arms may extend perpendicularly from the shaft, optionally at regular intervals along the length of the shaft.

In operation, the shaft rotates causing the arms to rotate. The substrate may be passed under the rotating shaft at a distance from the shaft which allows the arms to contact and break the substrate into smaller pieces.

Following preliminary fragmentation, the substrate pieces may be conveyed, optionally with the aid of a cooling belt, onto the profiled surface for fragmentation into granules.

The preliminary fragmentation of the substrate may have the advantage that the smaller pieces of substrate are more easily conveyed onto the profiled surface.

Step d) involves fragmenting the substrate into granules by means of a first rotating roller bearing on the substrate on the profiled surface.

The outer surface of the first rotating roller may be profiled (in addition to the profiled surface).

The profiling of the respective surface of the profiled surface and of the first rotating roller may be complementary such that fragmentation of the substrate occurs between the complementary profiled surfaces.

Alternatively, the profiling of the respective surfaces of the profiled surface and of the first rotating roller may be non-complementary such that fragmentation of the substrate occurs between the non-complementary profiled surfaces.

The profiling of the outer surface of the first rotating roller and/or the profiled surface may comprise one or more indentations, protrusions or both. The nature of the one or more indentations and/or protrusions may depend on the desired size and shape of the granules to be produced.

The indentations may, for example, be grooves and the protrusions may, for example, be ridges. The width of the grooves may vary depending on the shape and size of the granules to be produced. For example, the width of the grooves may be from 1 mm to 20 mm. Preferably, the width of the grooves is from 1 mm to 10 mm and more preferably, from 2 mm to 10 mm. The width of the ridges may vary depending on the shape and size of the granules to be produced. For example, the width of the ridges may be from 1 mm to 20 mm. Preferably, the width of the ridges is from 1 mm to 10 mm and more preferably, from 1 mm to 5 mm.

The grooves and/or ridges may have any arrangement effective to produce granules of the desired shape and size. For example, the grooves and/or ridges may be spaced randomly or at regular intervals around the outer surface of the first rotating roller and/or on the profiled surface. Additionally or alternatively, the grooves and/or ridges may be arranged longitudinally, horizontally or diagonally around the outer surface of the first rotating roller and/or on the profiled surface.

The ridges may be notched to form teeth or the like. Notched ridges may help to prevent the substrate from clogging up the profiled surface and/or the profiled surface of the first rotating roller. For example, the notched ridges on the profiled surface may help to remove the substrate from the profiled surface of the first rotating roller, in particular from the grooves, and/or vice versa.

The ridges and/or grooves of the profiled outer surface of the first rotating roller may run parallel with the ridges and/or grooves of the profiled surface. The ridges on the profiled outer surface of the first rotating roller may have a complementary fit with the grooves on the profiled surface and/or the ridges on the profiled surface may have a complementary fit with the grooves on the profiled surface of the first rotating roller.

Alternatively, the ridges and/or grooves of the profiled outer surface of the first rotating roller may run non-parallel to the ridges and/or grooves of the profiled surface, at any angle. For example, the ridges and/or grooves of the profiled outer surface of the first rotating roller may run perpendicular to the ridges and/or grooves of the profiled surface.

The profiled surface may be provided by the outer surface of a second roller. The second roller may be a rotating roller. Preferably in this case, the first and second rotating rollers are counter-rotating. By 'counter-rotating' is meant that one of the rollers rotates clockwise whilst the other rotates anticlockwise. The counter-rotation of the rollers helps urge the substrate between the two rollers through a pinch point, where it fragments into substantially dust-free granules.

The ridges and/or grooves on the outer surface of the first and/or second rotating roller may be arranged in relation to their direction of motion i.e. clockwise or anti-clockwise. For example, the ridges and/or grooves may be arranged at a suitable angle, $\alpha$, to the direction of motion of one of the first and second rotating rollers. Preferably, $\alpha=\pi/2$ or $\alpha=\pi/4$ to the direction of motion. The ridges and/or grooves on the other roller may be arranged at a suitable angle, $\beta$, to the direction of motion, where $\beta=\alpha+\pi/2$.

The profiling of the outer surface of the first rotating roller and/or the profiled surface may comprise one or more teeth.

The teeth on the outer surface of the first rotating roller may engage in a complementary manner with the teeth on the profiled surface, and/or vice versa.

The process may additionally comprise the step of separating dust from the additive granules formed in step d). For example, sieving the additive granules formed in step d). This may reduce the amount of dust present in the additive granules. One or more sieves may be used, and sieves suitable for this purpose are well-known in the art.

Following sieving, the amount of dust present in the additive granules may be less than 5%, less than 2%, less than 1%, less than 0.75%, less than 0.5%, less than 0.25%, less than 0.1%, less than 0.075%, less than 0.05%, less than 0.025%, less than 0.01%, or 0% by weight of dust present in the additive granules.

The additive granules formed via the process of the present disclosure may have a particle size distribution which can be expressed using the US mesh scale. The table below shows the conversion from mesh size to millimeters.

| Mesh | mm |
| --- | --- |
| 1 in | 25.4 |
| 7/8 in | 22.6 |
| 3/4 in | 19.0 |
| 5/8 in | 16.0 |
| 0.530 in | 13.5 |
| 1/2 in | 12.7 |
| 7/16 in | 11.2 |
| 3/8 in | 9.51 |
| 5/16 in | 8.00 |
| 0.265 in | 6.73 |
| 1/4 in | 6.35 |
| No. 3 | 5.66 |
| No. 4 | 4.76 |
| No. 5 | 4.00 |
| No. 6 | 3.36 |
| No. 7 | 2.83 |
| No. 8 | 2.38 |
| No. 10 | 2.00 |
| No. 12 | 1.68 |
| No. 14 | 1.41 |
| No. 16 | 1.19 |
| No. 18 | 1.00 |
| No. 20 | 0.841 |
| No. 25 | 0.707 |
| No. 30 | 0.595 |
| No. 35 | 0.500 |

The particle size distribution of the additive granules depends on the ultimate use of the granules. The additive granules may, for example, have a particle size distribution of −1 in +35 mesh i.e. 90% or more of the granules will pass through a 1 in mesh and be retained by a 35 mesh. Alternatively, the additive granules may have a particle size distribution of −3/4 in +35 mesh, −5/8 in +35 mesh, −3/8 in +35 mesh, −3 +35 mesh, −8 +35 mesh or −18 +35 mesh.

The present disclosure provides substantially dust-free additive granules. Consequently, a population of additive granules according to the disclosure is preferably constituted such that less than 15 wt. %, less than 10 wt. %, preferably less than 5 wt. %, more preferably less than 2 wt. %, even more preferably less than 1 wt. % and most preferably less than 0.5 wt. % will pass through a No. 35 US Mesh. Such a population is preferably fairly uniform in particle size distribution, preferably such that the standard deviation (a) in particle size distribution is less than about 5 mm, preferably less than about 3 mm, more preferably less than about 2 mm and most preferably less than about 1 mm.

The inventors of the present disclosure have unexpectedly found that the use of a first rotating roller bearing against the substrate on a profiled surface in the fragmenting step, results in the formation of substantially dust-free additive granules.

The present disclosure is advantageous over the prior art since substantially dust-free additive granules are formed without the need for an impressing step, for example where the substrate is impressed with the shape of the granules prior to fragmentation. By eliminating the need for an impressing step, the process of the present disclosure provides a simpler and potentially cheaper process for manufacturing substantially dust-free additive granules.

The process may be run as a continuous process from step a) through to step d). The steps of cooling the substrate (step b)), conveying the substrate onto a profiled surface (step c)) and fragmenting the substrate (step d)) may be carried out in a single process step. More specifically, the substrate may be cooled, conveyed and fragmented into granules by means of the first rotating roller bearing against the substrate on the profiled surface. In this embodiment, the first rotating roller and/or the profiled surface may be maintained at a reduced temperature. The temperature of the first rotating roller and/or the profiled surface may be effective to cool the substrate to a temperature at which it can be fragmented. Thus, the temperature of the first rotating roller and/or the profiled surface is dependent on the composition of the substrate, for example, the temperature may be from about −10° C. to about 50° C.

The additive or blend of additives may comprise one or more of an antioxidant, a stabilizer, a UV absorber, a light stabilizer, an acid scavenger, a nucleating agent, a clarifying agent, a metal deactivator and/or any other additive known in the art.

The antioxidants may comprise one or more of a phosphite, a phenolic compound, a polyphenolic compound, a thioester, a hydroquinone, a tocopherol, a hydroxylated thiodiphenyl ether, a O-, N- and S-benzyl compound, a hydroxybenzylated malonate, an aromatic hydroxybenzyl compound, a triazines, a benzyl phosphonate, ascorbic acid and/or an aminic antioxidant.

By way of specific and non-limiting examples, the phosphite antioxidant may comprise one or more of bis(2,4,di-t-butylphenyl)pentaerythritol diphosphite (Ultranox™ 626—CAS 26741-53-7); 2,4,6-tri-tert-butylphenyl-2-butyl-2-ethyl-1,3-propanediol phosphite (Ultranox® 641—CAS 161717-32-4); tris(2,4-di-t-butylphenyl)phosphite (Alkanox® 240—CAS 31570-04-4); tetrakis (2,4-di-t-butylphenyl)4,4′-biphenylene diphosphonite (Alkanox® 24-44—CAS 38613-77-3); tris(4-n-nonylphenyl)phosphite (TNPP—CAS 26523-78-4); tris(mono-nonylphenyl)-phosphite; distearylpentaerythritol diphosphite (Weston® 618—CAS 3806-34-6); bis(2,4-dicumylphenyl) pentaerythritol diphosphite (Doverphos® 9228—CAS 154862-43-8); Weston® 705—CAS 939402-02-5; tris(dipropyleneglycol) phosphite, $C_{18}H_{39}O_9P$ (Weston® 430—CAS 36788-39-3); poly(dipropylene glycol) phenyl phosphite (Weston® DHOP—CAS 80584-86-7); diphenyl isodecyl phosphite, $C_{22}H_{31}O_3P$ (Weston® DPDP—CAS 26544-23-0); phenyl diisodecyl phosphite (Weston® PDDP—CAS 25550-98-5); heptakis (dipropyleneglycol) triphosphite (Weston® PTP—CAS 13474-96-9); tris(4-n-nonylphenyl) phosphite (Weston® TNPP—CAS 26523-78-4); bis(2,6-di-ter-butyl-4-methylphenyl)pentaerythritol diphosphite (PEP 36—CAS 80693-00-1); and/or compatible mixtures of two or more thereof.

By way of specific and non-limiting examples, the phenolic antioxidant may comprise one or more of tetrakismethylene(3,5-di-t-butyl-4-hydroxyhydrocinnamate) methane (Anox® 20—CAS 6683-19-8); 2,2'thiodiethylene bis[3(3,5-di-t-butyl-4-hydroxyphenyl)propionate] (Anox® 70—CAS 41484-35-9); C13-C15 linear and branched alkyl esters of 3-(3'5'-di-t-butyl-4'-hydroxyphenyl) propionic acid (Anox® 1315—CAS 171090-93-0); octadecyl 3-(3',5'-di-t-butyl-4'-hydroxyphenyl) propionate (Anox® PP18—CAS 2082-79-3); 1,3,5-tris(3,5-di-t-butyl-4-hydroxybenzyl) isocyanurate (Anox® IC14—CAS 27676-62-6); 1,3,5-trimethyl-2,4,6-tris(3,5-di-t-butyl-4-hydroxybenzyl)benzene (Anox® 330—CAS 1709-70-2); 2,2'-ethylidenebis[4,6-di-t-butylphenol] (Anox® 29—CAS 35958-30-6); N,N'-hexamethylene bis[3-(3,5-di-t-butyl-4-hydroxyphenyl)propionamide] (Lowinox® HD98—CAS 23128-74-7); 1,2-bis(3,5-di-t-butyl-4-hydroxyhydrocinnamoyl)hydrazine (Lowinox® MD24—CAS 32687-78-8); triethyleneglycol-bis-[3-(3-t-butyl-4-hydroxy-5-methylphenyl)propionate] (Lowinox® GP45—CAS 36443-68-2); the butylated reaction product of p-cresol and dicyclopentadiene (Lowinox® CPL—CAS 68610-51-5); 2,2'methylenebis(6-t-butyl-4-methylphenol) (Lowinox® 22M46—CAS 119-47-1); 2-(1,1-dimethylethyl)-4,6-dimethyl-phenol (Lowinox® 624—CAS 1879-09-0); 1,3,5-tris(4-t-butyl-3-hydroxyl-2,6-dimethylbenzyl)-1,3,5-triazine-2,4,6-(1H, 3H, 5H)-trione (Lowinox® 1790); 6-tert-butyl-2-methylphenol, (CAS 2219-82-1); butylated hydroxytoluene (BHT—CAS 128-37-0); C9-C11 linear and branched alkyl esters of 3-(3',5'-di-t-butyl-4'-hydroxyphenyl)propionic acid (Naugard PS48®—CAS 125643-61-0); 2,6-di-tertiary-butyl-4-sec-butylphenol (Isonox®132); 2,6-di-tertiary-butyl-4-nonylphenol (Isonox® 232) and/or compatible mixtures of two or more thereof.

By way of specific and non-limiting examples, the thioester antioxidant may comprise one or more of dilauryl-3,3'-thiodipropionate (Naugard® DLTDP—CAS 123-28-4); distearyl-3,3'-thiodipropionate (Naugard® DSTDP—CAS 693-36-7); ditridecylthiodipropionate (Naugard® DTDTDP (liquid) CAS—10595-72-9); 2,2'thiodiethylene bis[3(3,5-di-t-butyl-4-hydroxyphenyl)propionate] (Anox® 70—CAS 41484-35-9); dimyristyl thiodipropionate (Cyanox® MTDP—CAS 16545-54-3); distearyl-disulfide (Hostanox® SE 10—CAS 2500-88-1); 2,4-bis(n-octylthiomethyl)-6-methylphenol (Irganox® 1520—CAS 110533-27-0); and/or compatible mixtures of two or more thereof.

The UV absorbers and light stabilizers may comprise one or more of a benzotriazole, a benzophenone, a benzoic acid ester, an acrylate, a nickel compound, a sterically hindered amine, an oxalamide and/or a triazine.

The acid scavengers may comprise one or more of an epoxidized oil, a metal salt of a fatty acid, a metal oxide, a metal hydroxide, a metal carbonate, a metal salt and/or a hydrotalcite-like compounds. The epoxidized oil may be selected from epoxidized castor oil, epoxidized sunflower oil, epoxidized linseed oil and epoxidized soy bean oil. The metal salt of a fatty acid may be selected from calcium stearate, zinc stearate and magnesium stearate. The metal oxide/hydroxide/carbonate/salt may be selected from calcium oxide, zinc oxide, calcium hydroxide, calcium carbonate, calcium lactate and zinc octanoate. The hydrotalcite-like compound may be a magnesium aluminium hydroxide carbonate hydrate, for example, DHT-4A—CAS 11097-59-9.

The nucleating agents may comprise one or more of an inorganic filler, an organic acid and/or a polymeric compound.

The additive or blend of additives may further comprise one or more of a plasticiser, a lubricant, an emulsifier, a pigment, a flow agent, a catalyst, a fluorescent whitener, an antistatic agent and/or a blowing agent.

Specific additives and blends of additives which may be formed into granules using the process of the present disclosure are outlined in WO 2005/071008, U.S. Pat. Nos. 5,240,642 and 6,033,600 which are herein incorporated by reference.

The additive granules may be added to a polymeric composition. Preferably, the additive granules are added to a polymeric composition in a stabilizing amount i.e. in an amount which causes the polymeric composition to have improved stability in any one of its physical or color properties in comparison to an analogous polymer composition without the additive granules. Examples of improved stability include, but are not limited to, improved stabilization against molecular weight degradation, color degradation, and the like, from, for example, melt processing, weathering and/or long term exposure to heat, light and/or other elements.

The polymeric composition may comprise one or more of a polyolefin homopolymer or copolymer, a polyalkylene terephthalate, a polyphenylene, an ether, a styrenic polymer or copolymer, a polyester, a polyurethane, a polysulfone, a polyimide, a polycarbonate, an acrylic polymer, a polyamide, a nitrile polymer, a polyacetal and/or a halide-containing polymer.

The polyolefin may comprise a homopolymer or copolymer of an alpha-olefin comprising between 2 and 12 carbon atoms, for example, ethylene, propylene, butene, pentene, hexene, heptene and octane; a cycloolefin, for example cyclopentene or norbornene; and/or compatible mixtures of two or more thereof. The copolymer may be a random copolymer or a block copolymer.

The styrenic polymer may comprise polystyrene, poly-(p-methylstyrene), poly-(α-methylstyrene), copolymers of styrene or α-methylstyrene with dienes or acrylic derivatives, for example styrene/butadiene, styrene/acrylonitrile, styrene/alkyl methacrylate and styrene/acrylonitrile/methylacrylate, and/or compatible mixtures of two or more thereof.

The acrylic polymer may comprise a polymer based on acrylic acid, methacrylic acid, methyl methacrylic acid, ethacrylic acid and/or compatible mixtures of two or more thereof. For example, the acrylic polymer may comprise polymethylmethacrylate.

The nitrile polymer may comprise a homopolymer or copolymer of acrylonitrile and/or its analogs, for example, polymethacrylonitrile, polyacrylonitrile, acrylonitrile/-butadiene polymers, acrylonitrile/alkyl acrylate polymers, acrylonitril/alkyl, methacrylate/butadiene polymers, and/or compatible mixtures of two or more thereof.

The halide-containing polymer may comprise polychloroprene, epichlorohydrin homo- and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinyl acetate copolymers, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anyhydride terpolymer, vinyl chloride-styrene-acrylonitrile copolymer, vinyl chloride-butadiene copolymer, vinyl chloride isoprene copolymer, vinyl chloride-chlorinated propylene copolymer, vinyl chloride-vinylidene chloride-vinyl acetate terpolymer, vinyl chloride-acrylic acid ester copolymers, vinyl chloride-maleic acid ester copolymers, vinyl chloride-methacrylic acid ester copolymers, vinyl chloride-acrylonitrile copolymer, and/or compatible mixtures of two or more thereof.

Examples of further suitable polymers are given in WO 2007/149143 which is herein incorporated by reference.

According to a second aspect of the present disclosure, there is provided an apparatus for forming substantially dust-free additive granules, comprising a first rotating roller configured to bear on a profiled surface onto which an substrate is conveyed and to fragment the conveyed substrate into granules.

The apparatus may additionally comprise an extruder, kneader and/or other melting and mixing device, one or more cooling drums, a cooling belt, a rotating shaft with arms extending therefrom and/or one or more sieves.

For the avoidance of doubt, all features relating to the first aspect of the present disclosure may also relate to the second aspect of the present disclosure and vice versa.

The disclosure will now be more specifically described with reference to the following figures and non-limiting examples:

FIG. 1 shows a deconstructed twin-screw extruder which may be used in step a) of the disclosure. The two screws 1 are formed from a metal, for example steel. The outer diameter of the screws 1 is 73 mm and the inner diameter of the screws is 45 mm. The length to outer diameter ratio (L:Do) of the screws 1 is 20:1. When in use, the screws 1 may counter-rotate or co-rotate to shear the additive or blend of additives.

The housing is formed from two halves 2, 3 which may be fixed together to form a barrel surrounding the two screws. The two halves of the housing 2, 3 can be separated to reveal the two screws when the extruder is not in use. The separable housing enables the screws to the cleaned, maintained and replaced when required. The two halves of the housing are formed from a metal, for example steel.

By virtue of the thermal energy from the extruder and from the mechanical (shear) energy of the screws 1, the additive or blend of additives is processed into a workable substrate.

Figure 2:
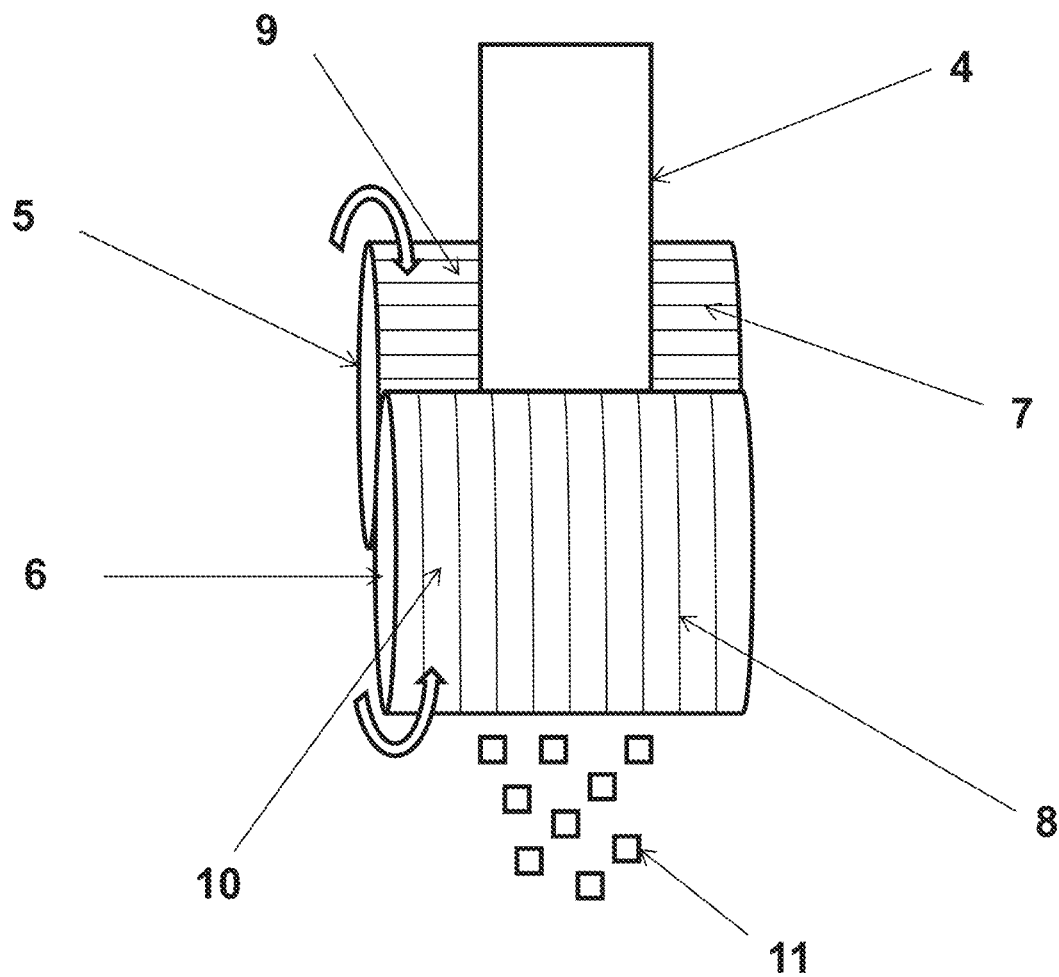
FIG. 2 is a schematic diagram of a pair of counter-rotating rollers having profiled surfaces with non-complementary ridges and grooves.

FIG. 2 is a schematic diagram of a pair of counter-rotating rollers which may be used in step d) of the disclosure. The cooled extrudate 4 is fed between a pair of counter-rotating rollers 5, 6. One of the rollers 5 rotates clockwise whilst the other roller 6 rotates anti-clockwise. The counter-rotation of the rollers 5, 6 helps to urge the cooled extrudate 4 between the rollers and through a pinch point (not shown). The rollers are formed from a metal.

Each of the rollers 5, 6 has ridges 7, 8 and grooves 9, 10 around its outer surface. The ridges 7 and grooves 9 of the clockwise rotating roller 5 run perpendicular to the direction of motion whilst the ridges 8 and grooves 10 of the anti-clockwise rotating roller 6 run parallel with the direction of motion. The ridges 7, 8 have a width of 2 mm and the grooves 9, 10 have a width of 4 mm.

As the cooled extrudate 4 is fed between the pinch point of the counter-rotating rollers 5, 6 it is fragmented into granules of roughly equal size 11 which are expelled from the opposite side of the rollers. The size and shape of the granules 11 is determined by the nature of the outer surface of the counter-rotating rollers 5, 6. Advantageously, the cooled extrudate 4 is fragmented into granules 11 in a single process step.

Figure 3:
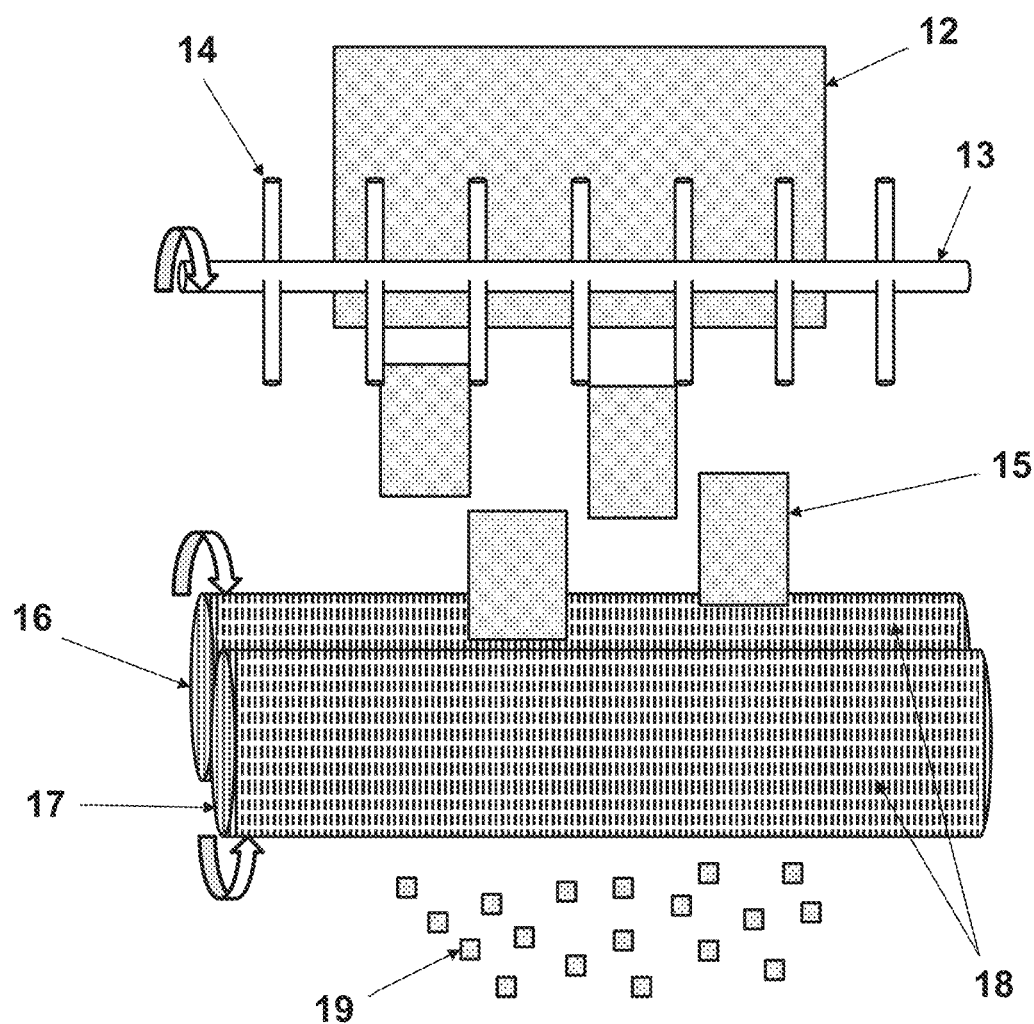
FIG. 3 is a schematic diagram of a rotating shaft with arms extending therefrom, in-line with a pair of counter-rotating rollers having profiled surfaces with complementary ridges and grooves.

FIG. 3 is a schematic diagram of a rotating shaft with arms extending therefrom, in-line with a pair of counter-rotating rollers having profiled surfaces with complementary ridges and grooves. The cooled substrate 12 is passed under a rotating shaft 13 having arms extending perpendicularly therefrom 14 at regular intervals along the length of the shaft. The distance between the cooled substrate 12 and the rotating shaft 13 is such that the arms 14 contact and break the substrate into smaller pieces 15, which preferably have a length and width of between about 100 mm and about 150 mm.

The substrate pieces 15 are conveyed, with the aid a cooling belt (not shown), to a pair of counter-rotating rollers 16, 17. One of the rollers 16 rotates clockwise whilst the other roller 17 rotates anti-clockwise. The counter-rotation of the rollers 16, 17 helps to urge the substrate pieces 15 between the rollers and through the pinch point (not shown). The rollers are formed from a metal.

Each of the rollers 16, 17 has ridges and grooves 18 around its outer surface, which run parallel with the direction of motion of the rollers. The ridges are notched to form teeth. The teeth on one roller 16 have a complementary fit with the grooves on the other roller 17 and vice versa.

As the substrate pieces 15 are fed through the pinch point between the counter-rotating rollers 16, 17 they are fragmented into granules of roughly equal size 19 which are expelled from the opposite side of the rollers. The size and shape of the granules 19 are determined by the nature of the outer surface of the counter-rotating rollers 16, 17. Advantageously, the cooled substrate 12 is fragmented into granules of roughly equal size 19 without the need for an impressing step.

Figure 4:
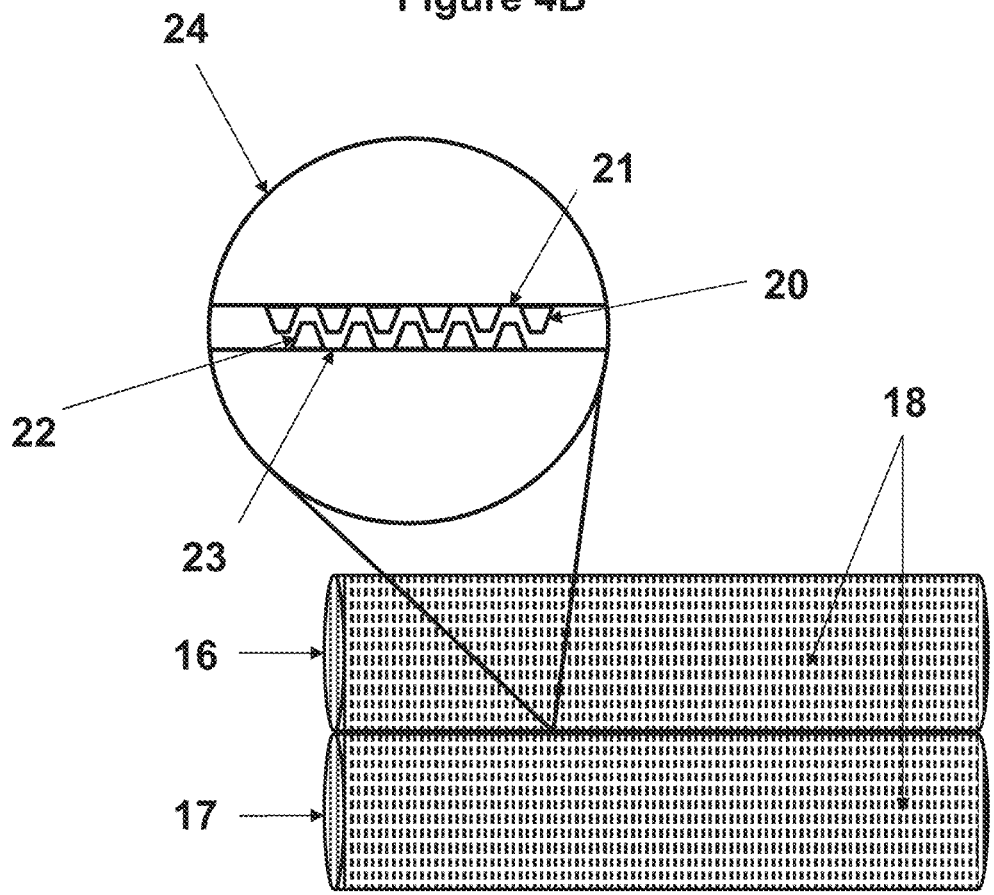
FIG. 4A is a schematic diagram highlighting a section of the pinch point between the counter-rotating rollers of FIG. 3.
FIG. 4B is a magnified view of the schematic diagram of FIG. 4A.

FIG. 4 is a schematic diagram highlighting a section of the pinch point between the counter-rotating rollers of FIG. 3.

As outlined above, each of the counter-rotating rollers 16, 17 has ridges and grooves around its outer surface, which run parallel with the direction of motion of the rollers.

As can be seen in the enlarged section 24 of the pinch point between the counter-rotating rollers 16, 17, the ridges are notched to form teeth 20, 22. The teeth 20 on the first roller 16 have a complementary fit with the grooves 23 on the second roller 17. Similarly, the teeth 22 on the second roller 17 have a complementary fit with the grooves 21 on the first roller 16.

As the substrate pieces (not shown) are fed through the pinch point between the counter-rotating rollers 16, 17 they are fragmented into additive granules of roughly equal size.

EXAMPLES

Example 1

Various additives were mixed together in a high speed mixer to form substantially homogeneous blends with the compositions shown in Table 1.

TABLE 1

| | Component (%) | | | | | | | | | |
|---|---|---|---|---|---|---|---|---|---|---|
| Samples | ANOX$^{RTM}$ 20 | ANOX$^{RTM}$ IC 14 | NAUGARD$^{RTM}$ DSTDP | ALKANOX$^{RTM}$ 240 | CaSt | ZnSt | DHT-4A | NaBz | Pretax 70 | NU 500 |
| 1 | 28.9 | — | — | — | 44.4 | 26.7 | — | — | — | — |
| 2 | 27.8 | — | — | 55.5 | — | — | 16.7 | — | — | — |
| 3 | 33.3 | — | — | 16.7 | 50.0 | — | — | — | — | — |
| 4 | 16.3 | — | 48.8 | 11.6 | — | — | — | 23.3 | — | — |
| 5 | 10.2 | — | 12.8 | 15.4 | 15.4 | — | — | — | 10.3 | 51.3 |

TABLE 1-continued

| Samples | ANOX^RTM 20 | ANOX^RTM IC 14 | NAUGARD^RTM DSTDP | ALKANOX^RTM 240 | CaSt | ZnSt | DHT-4A | NaBz | Pretax 70 | NU 500 |
|---|---|---|---|---|---|---|---|---|---|---|
| 6 | — | 12.0 | — | 60.0 | 28.0 | — | — | — | — | — |
| 7 | 50.0 | — | — | 50.0 | — | — | — | — | — | — |
| 8 | 33.3 | — | — | 66.7 | — | — | — | — | — | — |

Each of the samples was fed into a LPE® SLJ-75 twin-screw extruder at a rate of 330 kg/h. The twin-screw extruder had two screws with an outer diameter of 73 mm and an inner diameter of 45 mm. The length to outer diameter ratio of the screws (L:Do) was 20:1. The rotation speed of the screws varied according to the throughput and was up to 260 RPM. Within the twin-screw extruder there were three heating zones maintained at temperatures of 86° C., 100° C. and 110° C. respectively. The additive blends were extruded through an open die at the far end of the extruder, as a workable extrudate.

The extrudate was passed between two cooling drums and onto a cooling belt. The cooling drums were maintained at a temperature of 18° C. and rotated at a speed of 1.6 RPM. The distance between the two cooling drums was between 1 mm and 2 mm. As the extrudate passed between the cooling drums, the extrudate was cooled and formed into a sheet having a thickness of between 1 mm and 2 mm.

The sheet of extrudate was then passed onto a Sandvik® cooling belt which further cooled the extrudate. The cooling belt was 7 m long, moved at a speed according to the output and formulation, and was maintained at a temperature of 18° C. The cooling belt passed the cooled extrudate to a pair of counter-rotating rollers. One of the counter-rotating rollers had ridges and grooves running perpendicular to the motion of the roller and the other had ridges and grooves running parallel with the motion of the roller on the other roller. The ridges had a width of 2 mm and the grooves had a width of 4 mm. The counter-rotating rollers fragmented the cooled extrudate into granules.

It was found that all of the samples ran well in the optimized process to form granules of a roughly equal size which were substantially dust-free.

Figure 5:
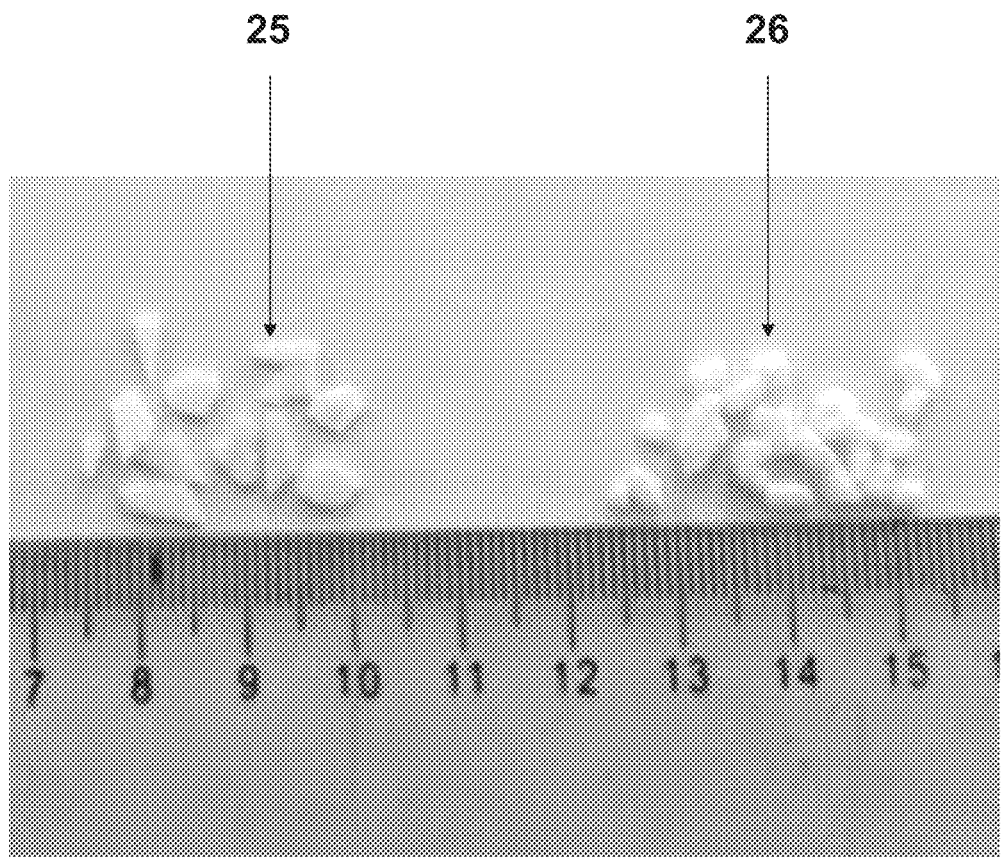
FIG. 5 is a photograph showing the additive granules formed using the process of the present disclosure compared to those formed using a prior art process.

FIG. 5 is a photograph showing granules formed from sample 1 using the process outlined in Example 1 and granules formed from the prior art process outlined in U.S. Pat. No. 5,240,642. It can be seen that the granules 25 from the Example 1 process are of a similar size to the granules 26 formed from the prior art process.

Example 2

An investigation into the friability of the additive granules of the present disclosure compared to those of the prior art process in U.S. Pat. No. 5,240,642 was carried out. Additive granules according to the present disclosure were formed from Sample 1 using the process outlined in Example 1. An Octagon 200 sieve shaker manufactured by Endecotts® was used to carry out the friability test. The sieve shaker was equipped with four sieves with decreasing mesh size, from top downward, of 2.8 mm, 1.7 mm, 1.0 mm and 0.5 mm. The sieving was carried out by charging glass balls of 17.3 mm diameter and 6.5 g weight to each of the sieves. The number of glass balls charged to the sieves was:

| No. Glass Balls | Sieve Size (mm) |
|---|---|
| 11 | 2.8 |
| 10 | 1.7 |
| 9 | 1.0 |
| 8 | 0.5 |

For each sample, 100 g of the granules was sieved for 5 minutes in the absence of the glass balls in order to determine the initial granule size distribution ('initial'). The glass balls were then charged to the sieves and the granule samples sieved again for 5 minutes ('sieved'). The results from the investigation are shown in FIG. 6.

Figure 6:
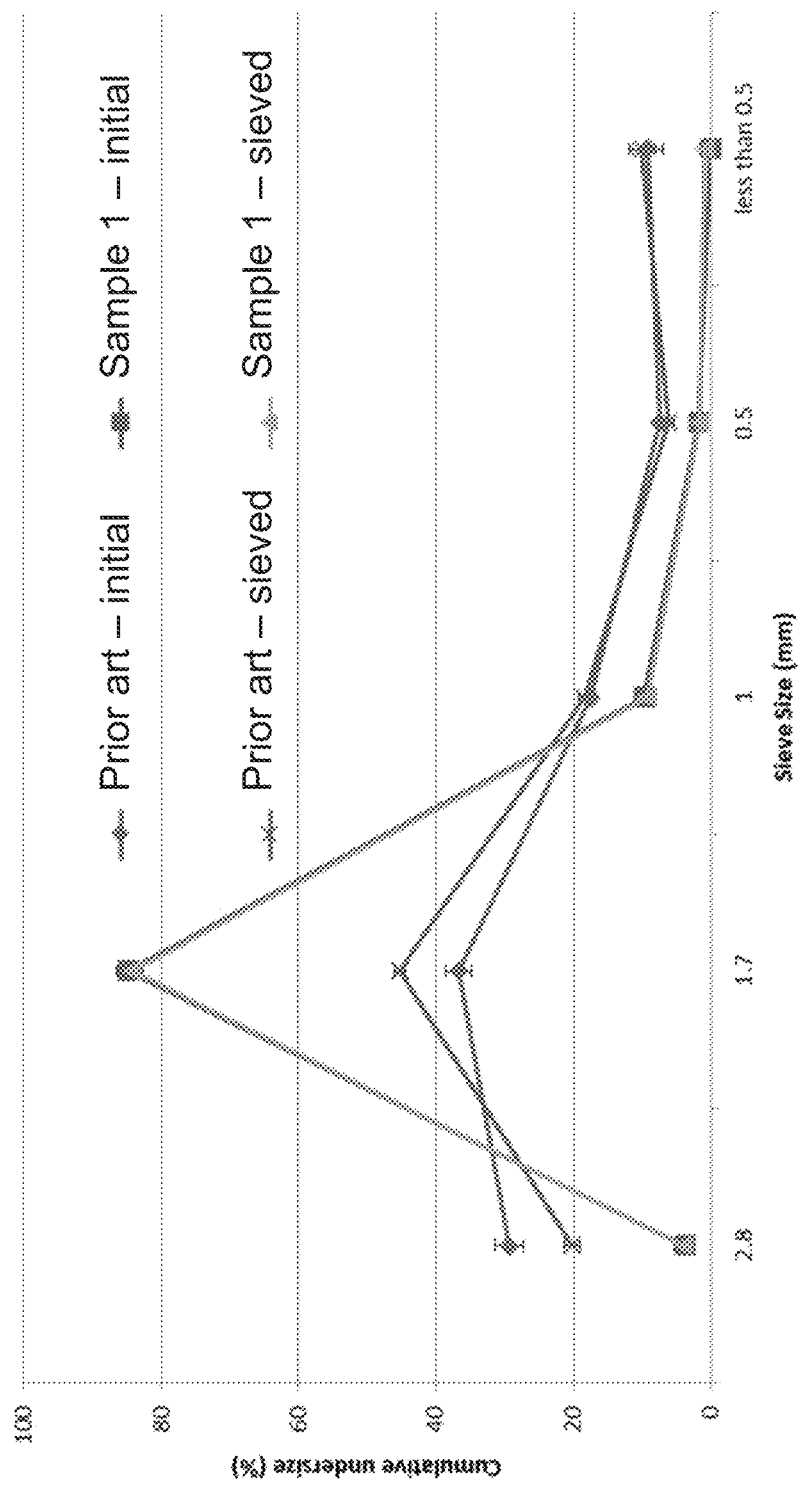
FIG. 6 is a graph showing the friability of the additive granules formed using the process of the present disclosure compared to those formed using a prior art process.

From FIG. 6, it can be seen that the friability of Sample 1 is less than the friability of the prior art sample. This is particularly highlighted by the differences observed at 2.8 mm and 1.7 mm sieve size. The results suggest that the optimized process, in particular the use of a first rotating roller bearing on the extrudate on a profiled surface in step d), results in granules with greater resistance to abrasion.

Example 3

Various additives were mixed together in a high speed mixer to form substantially homogeneous blends with the compositions shown in Table 2.

TABLE 2

| Samples | ANOX^RTM IC-14 | ANOX^RTM 20 | ALKANOX^RTM 240 | ZnSt | CaSt | ANOX^RTM 330 | DHT-4A | DHT-4V | NAUGARD^RTM XL-1 | NAUGARD^RTM DSTDP |
|---|---|---|---|---|---|---|---|---|---|---|
| 12 | — | 28.7 | — | 26.8 | 44.5 | — | — | — | — | — |
| 13 | — | 33.7 | 66.3 | — | — | — | — | — | — | — |
| 14 | — | 19.6 | 59.9 | 20.5 | — | — | — | — | — | — |
| 15 | — | — | 17.0 | — | 34.3 | 48.7 | — | — | — | — |
| 16 | — | 28.7 | 55.6 | — | — | — | 15.7 | — | — | — |
| 17 | 12.0 | — | 28.0 | — | 60.0 | — | — | — | — | — |
| 18 | — | 19.0 | 6.0 | — | — | — | — | 6.0 | 25.0 | 44.0 |

Each of the samples was fed into a LPE® SLJ-75 twin-screw extruder at a rate of up to 500 kg/h (depending of the formulation of the sample). The twin-screw extruder had two screws with an inner diameter to outer diameter ratio (Di/Do) of 1.55. The length to outer diameter ratio of the screws (L:Do) was 36:1. The rotation speed of the screws varied depending on the composition but was typically between 30 RPM and 70 RPM. Within the twin-screw extruder there were 5 heating zones maintained at elevated temperatures. The temperature of each of the heating zones was dependent on the formulation of the sample, and was typically between 70° C. and 130° C. The additive blends were extruded through an open die at the far end of the extruder, as a workable extrudate.

The extrudate was passed between two cooling drums and onto a cooling belt. The cooling drums were maintained at a reduced temperature. The temperature of the cooling drums was dependent on the formulation of the sample, and was typically between 10° C. and 30° C. The cooling drums were rotated at a speed of between 1 RPM and 5 RPM. The distance between the two cooling drums was between 1 mm and 3 mm. As the extrudate passed between the cooling drums, the extrudate was cooled and formed into a sheet having a thickness of between 1 mm and 3 mm.

The sheet of extrudate was then passed onto a Sandvik® cooling belt which further cooled the extrudate. The cooling belt was 7 m long, moved at a speed according to the output and formulation of the sample, and was maintained at a temperature between 10° C. and 30° C. The cooling belt passed the cooled extrudate under a rotating shaft having arms extending perpendicularly therefrom. The distance between the cooled extrudate and the rotating shaft was such that the arms contacted and broke the extrudate into smaller extrudate pieces with a length and width between 100 mm and 150 mm.

The cooling belt was then used to pass the extrudate pieces to a pair of counter-rotating rollers. Each of the counter-rotating rollers had ridges and grooves around its outer surface, which ran parallel with the direction of motion of the rollers. The ridges were notched to form teeth. The teeth on one roller had a complementary fit the grooves on the other roller and vice versa. The counter-rotating rollers fragmented the extrudate pieces into granules.

These granules were subsequently sieved to give granules with less than 1% dust by weight of the granules.

It was found that all of the samples ran well in the optimized process to form granules of a roughly equal size which were substantially dust-free.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A process for forming substantially dust-free additive granules, comprising the steps of:
    a. extruding or otherwise processing an additive or blend of additives to provide a substrate;
    b. cooling the substrate;
    c. conveying the substrate onto a profiled surface; and
    d. fragmenting the substrate into granules by means of a first rotating roller bearing on the substrate on the profiled surface;
    e. wherein the process excludes an impressing step.

2. The process according to claim 1, wherein the additive or blend of additives is extruded through an open-die to provide the substrate.

3. The process according to claim 1, wherein the first rotating roller has a profiled outer surface.

4. The process according to claim 3, wherein the profiles of the profiled surface and of the outer surface of the first rotating roller are complementary such that fragmentation of the substrate occurs between the complementary profiles.

5. The process according to claim 3, wherein the profiles of the profiled surface and of the outer surface of the first rotating roller are non-complementary such that fragmentation of the substrate occurs between the non-complementary profiles.

6. The process according to claim 3, wherein the profiled surface of the first rotating roller is profiled by means of one or more ridges or grooves, wherein the ridges are notched to form teeth.

7. The process according to claim 1, wherein the profiled surface is profiled by one or more ridges grooves, wherein the ridges are notched to form teeth.

8. The process according to claim 7, wherein the ridges or grooves of the profiled outer surface of the first rotating roller run parallel with the ridges or grooves of the profiled surface.

9. The process according to claim 6, wherein the grooves have a width of from about 1 mm to about 20 mm.

10. The process according to claim 6, wherein the ridges have a width of from about 1 mm to about 20 mm.

11. The process according to claim 3, wherein the profiled outer surface of the first rotating roller or the profiled surface comprises one or more teeth.

12. The process according to claim 11, wherein the teeth on the outer surface of the first rotating roller engage in a complementary manner with the teeth on the profiled surface.

13. The process according to claim 1, wherein the profiled surface is provided by an outer surface of a second roller.

14. The process according to claim 13, wherein the second roller is a rotating roller.

15. The process according to claim 14, wherein the first rotating roller and the second rotating roller counter-rotate.

16. The process according to claim 1, wherein step b) is carried out using one or more cooling drums or a cooling belt.

17. The process according to claim 1, wherein prior to step d) the substrate is subjected to preliminary fragmentation into smaller substrate pieces.

18. The process according to claim 17, wherein the preliminary fragmentation occurs during step c).

19. The process according to claim 17, wherein the preliminary fragmentation is carried out using a rotating shaft with arms extending therefrom.

20. The process according to claim 19, wherein the arms extend perpendicularly from the rotating shaft at regular intervals along the shaft.

21. The process according to claim 17, wherein the smaller substrate pieces have a width or length of between about 100 mm to about 150 mm.

22. The process according to claim 1, wherein the substrate is cooled before or during conveyance to the profiled surface.

23. The process according to claim 1, wherein dust is separated from the granules formed in step d) by sieving.

24. The process according to claim 1, wherein the additive granules comprise less than 15% dust by weight of the additive granules.

25. The process according to claim 1, wherein the particle size distribution of the additive granules is −1 in +35 mesh.

26. The process according to claim 1, wherein the standard deviation in particle size distribution of the additive granules is less than about 5 mm.

27. The process according to claim 1, wherein the additive or blend of additives comprises one or more of an antioxidant, a stabiliser, a UV absorber, a light stabiliser, an acid scavenger, a nucleating agent, a clarifying agent or a metal deactivator.

28. The process according to claim 27, wherein:
a. the antioxidant comprises one or more of a phosphite, a phenolic compound, a polyphenolic compound, a thioester, a hydroquinone, a tocopherol, a hydroxylated thiodiphenyl ether, a O-, N- and S-benzyl compound, a hydroxybenzylated malonate, an aromatic hydroxybenzyl compound, a triazines, a benzyl phosphonate, ascorbic acid or an aminic antioxidant;
b. the UV absorber or the light stabiliser comprises one or more of a benzotriazole, a benzophenone, a benzoic acid ester, an acrylate, a nickel compound, a sterically hindered amine, an oxalamide or a triazine;
c. the acid scavenger comprises one or more of an epoxidised oil, a metal salt of a fatty acid, a metal oxide, a metal hydroxide, a metal carbonate, a metal salt or a hydrotalcite-like compounds; or
d. the nucleating agent comprises one or more of an inorganic filler, an organic acid or a polymeric compound.

29. The process according to claim 27, wherein the additive or blend of additives further comprises one or more of a plasticiser, a lubricant, an emulsifier, a pigment, a flow agent, a catalyst, a fluorescent whitener, an antistatic agent or a blowing agent.

* * * * *